United States Patent
Finlay et al.

(10) Patent No.: US 11,402,205 B2
(45) Date of Patent: Aug. 2, 2022

(54) SENSOR FOR A ROTATABLE ELEMENT

(71) Applicant: Salunda Limited, Oxfordshire (GB)

(72) Inventors: Alan Patrick John Finlay, Herefordshire (GB); John Mark Newton, Oxfordshire (GB); Andrew Henry John Larkins, Berkshire (GB); Mathew William Davis, Stithians (GB); Grant Nicholls, Romsey (GB)

(73) Assignee: Salunda Limited, Oxfordshire (GB)

(*) Notice: Subject to any disclaimer, the term of this patent is extended or adjusted under 35 U.S.C. 154(b) by 741 days.

(21) Appl. No.: 16/347,787

(22) PCT Filed: Aug. 24, 2017

(86) PCT No.: PCT/GB2017/052494
§ 371 (c)(1),
(2) Date: May 6, 2019

(87) PCT Pub. No.: WO2018/087511
PCT Pub. Date: May 17, 2018

(65) Prior Publication Data
US 2019/0376787 A1    Dec. 12, 2019

(30) Foreign Application Priority Data

Nov. 9, 2016  (GB) ...................................... 1618910
Jan. 25, 2017  (GB) ...................................... 1701273
(Continued)

(51) Int. Cl.
*G01C 9/08*        (2006.01)
(52) U.S. Cl.
CPC ...................................... *G01C 9/08* (2013.01)

(58) Field of Classification Search
CPC ...................................... G01C 9/06; G01C 9/08
(Continued)

(56) References Cited

U.S. PATENT DOCUMENTS 3,799,364 A    3/1974 Kelly et al.
3,799,634 A    3/1974 Sernetz et al.
(Continued)

FOREIGN PATENT DOCUMENTS

CN    1734235 A    2/2006
CN    1740746 A    3/2006
(Continued)

OTHER PUBLICATIONS

Ha et al. "A Wireless MEMS-Based Inclinometer Sensor Node for Structural Health Monitoring", Sensors, vol. 13, No. 12, Nov. 26, 2013.
(Continued)

*Primary Examiner* — George B Bennett
(74) *Attorney, Agent, or Firm* — Honigman LLP

(57) ABSTRACT

A sensor unit mountable on a rotatable element on a platform that is itself movable, and includes an orientation sensor arranged to take measurements that are dependent on the orientation of the sensor unit, a processor arranged to derive a rotational position signal representing the orientation of the rotatable element from the measurements, and a buffer arranged to buffer a series of recent measurements taken by the orientation sensor over a predetermined period of time. The processor derives the rotational position signal making a correction to compensate for the effect of the motion of the platform on the measurements on the basis of the overall series of measurements buffered in the buffer.

37 Claims, 12 Drawing Sheets

(30) Foreign Application Priority Data

| Feb. 28, 2017 | (GB) | ................................. | 1703269 |
|---|---|---|---|
| Apr. 3, 2017 | (GB) | ................................. | 1705355 |
| May 17, 2017 | (GB) | ................................. | 1707923 |

(58) Field of Classification Search
USPC .................. 33/1 PT, 366.11, 366.13, 366.14
See application file for complete search history.

(56) References Cited

U.S. PATENT DOCUMENTS

| 4,042,123 | A |  | 8/1977 | Sheldon et al. |
| 4,044,895 | A |  | 8/1977 | Adair |
| 4,739,264 | A |  | 4/1988 | Kamiya et al. |
| 4,914,263 | A |  | 4/1990 | Behr |
| 4,947,690 | A |  | 8/1990 | Cleveland |
| 5,829,148 | A | * | 11/1998 | Eaton .................. G01B 5/008 |
|  |  |  |  | 439/24 |
| 5,866,818 | A |  | 2/1999 | Sumi et al. |
| 6,533,494 | B1 |  | 3/2003 | Gordon |
| 6,851,306 | B2 |  | 2/2005 | Shost et al. |
| 6,892,812 | B2 |  | 5/2005 | Niedermayr et al. |
| 7,134,334 | B2 |  | 11/2006 | Schirmer et al. |
| 7,510,028 | B2 |  | 3/2009 | Welsh |
| 7,841,094 | B2 | * | 11/2010 | Schumacher .......... G01B 21/22 |
|  |  |  |  | 33/290 |
| 9,404,346 | B2 |  | 8/2016 | Gray et al. |
| 10,823,560 | B2 | * | 11/2020 | Uchiyama ................ G01C 5/06 |
| 2004/0113778 | A1 |  | 6/2004 | Script et al. |
| 2005/0092524 | A1 |  | 5/2005 | Herst |
| 2005/0194185 | A1 |  | 9/2005 | Gleitman |
| 2006/0027030 | A1 |  | 2/2006 | Schofl |
| 2006/0124353 | A1 |  | 6/2006 | Juhasz et al. |
| 2006/0173637 | A1 |  | 8/2006 | Martin |
| 2007/0010960 | A1 |  | 1/2007 | Tellenbach et al. |
| 2007/0062279 | A1 |  | 3/2007 | Chan et al. |
| 2009/0238663 | A1 |  | 9/2009 | Littlely |
| 2009/0326858 | A1 |  | 12/2009 | Ueda et al. |
| 2010/0089159 | A1 |  | 4/2010 | Younsi et al. |
| 2010/0104401 | A1 |  | 4/2010 | Hopkins et al. |
| 2010/0149797 | A1 |  | 6/2010 | Cordes et al. |
| 2010/0303586 | A1 |  | 12/2010 | Hankins et al. |
| 2011/0295546 | A1 |  | 12/2011 | Khazanov |
| 2012/0020758 | A1 |  | 1/2012 | Springett et al. |
| 2012/0038486 | A1 |  | 2/2012 | Sinclair et al. |
| 2012/0103623 | A1 |  | 5/2012 | Wijning et al. |
| 2012/0305261 | A1 |  | 12/2012 | Roodenburg et al. |
| 2012/0319503 | A1 |  | 12/2012 | Johnson |
| 2013/0032405 | A1 |  | 2/2013 | Braxton |
| 2013/0096731 | A1 |  | 4/2013 | Tamari et al. |
| 2013/0154624 | A1 | * | 6/2013 | Taylor ..................... G01C 9/06 |
|  |  |  |  | 324/207.25 |
| 2014/0032036 | A1 |  | 1/2014 | Cho et al. |
| 2015/0010372 | A1 |  | 1/2015 | Herrema |
| 2015/0077219 | A1 |  | 3/2015 | Keller, Jr. et al. |
| 2016/0076920 | A1 |  | 3/2016 | Newton et al. |
| 2016/0201408 | A1 |  | 7/2016 | Little et al. |
| 2016/0208566 | A1 |  | 7/2016 | Bowley et al. |
| 2017/0306710 | A1 |  | 10/2017 | Trydal et al. |
| 2018/0002994 | A1 |  | 1/2018 | Albanese |
| 2018/0058158 | A1 |  | 3/2018 | Rice, II |
| 2021/0404809 | A1 | * | 12/2021 | Kim ....................... G01C 17/34 |

FOREIGN PATENT DOCUMENTS

| CN |  | 1836154 | A | 9/2006 |
| CN |  | 1884985 | A | 12/2006 |
| CN |  | 1931090 | A | 3/2007 |
| CN | 101027961 | A | 9/2007 |
| CN | 101473193 | A | 7/2009 |
| CN | 202520252 | U | 11/2012 |
| CN | 103569131 | A | 2/2014 |
| CN | 203672369 | U | 6/2014 |
| DE |  | 3115587 | A1 | 11/1982 |
| EP |  | 2554754 | A1 | 2/2013 |
| EP |  | 2554784 | A2 | 2/2013 |
| GB |  | 1588849 | A | 4/1981 |
| GB |  | 2175629 | A | 12/1986 |
| JP | 2008281508 | A | 11/2008 |
| WO | WO-2010141287 | A2 | 12/2010 |
| WO | WO-2012012326 | A1 | 1/2012 |
| WO | WO-2015/015150 | A1 | 2/2015 |
| WO | WO-2016075478 | A1 | 5/2016 |

OTHER PUBLICATIONS

U.S. Appl. No. 62/381,822, filed Aug. 31, 2016.
U.S. Appl. No. 62/413,672, filed Oct. 27, 2016.
Office Action for U.S. Appl. No. 16/039,108 dated Oct. 3, 2018.
Office Action for U.S. Appl. No. 16/039,058 dated Oct. 22, 2018.
Spence E. "Condition Monitoring and MEMs Accelerometers" Jul. 31, 2019, pp. 1-4, XPO55419227.
Office Action for U.S. Appl. No. 16/039,058 dated Feb. 22, 2019.
Office Action for U.S. Appl. No. 16/039,058 dated Jul. 1, 2019.
Chinese Office Action for Application 201780069210.8 dated Sep. 3, 2020.

* cited by examiner

SENSOR FOR A ROTATABLE ELEMENT

TECHNICAL FIELD

The present invention relates to a sensor for a rotatable element.

BACKGROUND

In many applications it is desirable to sense the orientation of a rotatable element that is rotatable, for example to provide safety during operation of the rotatable element. In the event of a mechanical failure or a failure in an actuation system for the rotatable element, which may be for example pneumatic, then the rotatable element might not be in the expected position which may create safety issues.

There are various types of sensing technology that are used to sense the rotation of a rotatable element that rotates continuously. However, such sensing technology generally relies on periodic measurements that result from the continuous motion, and as such is not directly applicable to a rotatable element that is rotatable within a limited range of rotation or where changes in orientation typically occur sporadically.

SUMMARY

The first aspect of the present invention tackles a potential difficulty when the rotatable element is mounted on a platform that is itself movable, such as a floating platform or a moving vehicle or swaying container, for example a floating platform as may be used for offshore drilling or exploration. Notionally, if a sensor unit were provided with an orientation sensor to detect the absolute orientation of the rotatable element, then the measurements taken by the are affected by the movement of the platform, not just the orientation (rotational position) of the rotatable element with respect to platform. This can lead to difficulties in sensing the orientation of the rotatable element, and potentially to erroneous sensing.

According to a first aspect of the present invention, there is provided a sensor unit that is mountable on a rotatable element on a platform that is itself movable, the sensor unit comprising: an orientation sensor arranged to take measurements that are dependent on the orientation of the sensor unit; and a processor arranged to derive a rotational position signal representing the orientation of the rotatable element from the measurements; and a buffer arranged to buffer a series of recent measurements taken by the orientation sensor over a predetermined period of time, wherein the processor is arranged to derive the rotational position signal making a correction to compensate for the effect of the motion of the platform on the measurements on the basis of the overall series of measurements buffered in the buffer.

The sensor unit may be mounted on the rotatable element and includes an orientation sensor that takes measurements that are dependent on the orientation of the sensor unit. In principle, such measurements allow for a simple and reliable detection of the rotational position of the rotatable element. In particular, it allows the use of a type of sensor that is simpler than a typical external sensor with sufficiently reliable sensing. Similarly, the sensor unit may have a relatively low power consumption permitting use of an internal power source such as a battery and being capable of being run for extended periods of time.

The potential difficulty when the rotatable element is mounted on a platform that is itself movable, as discussed above, issue is dealt with by buffering a series of recent measurements taken over a predetermined period of time in a buffer and using the overall buffered series of measurements to make a correction to compensate for the effect of the motion of the platform on the measurements.

It has been appreciated that the motion of the platform can be characterized by the overall series of measurements buffered in the buffer over the predetermined period of time, despite the fact that the sensor unit is mounted on the rotatable element. This is because the platform moves with the platform, and so this motion typically occurs at a relatively slow rate compared to the movement of the rotatable element with respect to the platform, for example being caused primarily by waves in the case of a floating platform. Thus, the overall series of measurements taken over the predetermined period of time characterize the motion of the platform, and can be used to make a correction that compensates for that motion when deriving the rotational position signal from the measurements.

The processor may be further arranged to associate metadata with the rotational position signal. Such metadata may include one of more of: time information; sensor identity, rotatable element identity, number of rotatable element cycles, count of rotatable element being in open position, count of rotatable element being in closed position, rotatable element speed, rotatable element acceleration, rotatable element angle, battery level, orientation sensor signal level; signal polarization, antennae signal strength, sensor location, signal triangulation, and location, which may be detected by a geolocation unit in the sensor unit.

The sensor unit may further comprise a wireless communication interface arranged to wirelessly communicate the rotational position signal. This allows for remote location of the sensor unit, without the need to make a wired connection. That reduces installation difficulties and avoids risks associated with damage to the wires.

The sensor unit may further comprise a light source and be arranged to modulate the light output by the light source to represent the orientation of the rotatable element. This allows for a wireless sensor unit to be provided that is suitable for use in remote locations without the need to make an electrical connection, as the output of the light source may be monitored.

Further according to the first aspect of the present invention, there is provided a method corresponding to the operation of the sensor unit.

The second aspect of the present invention relates to the use of an accelerometer to take measurements that are dependent on the orientation of the sensor unit. In principal, an accelerometer is suitable to detect the orientation of a rotatable element by detecting acceleration relative to an inertial frame, hence indicating the direction of acceleration due to the earth's gravitational field. Furthermore, an accelerometer provides a solution having a relatively low power consumption, which is important in many applications, for example to reduce maintenance requirements and/or where the rotatable element is remotely located.

According to the second aspect of the present invention, there is provided a sensor unit for a rotatable element that is mountable on a rotatable element, the sensor unit comprising: an accelerometer arranged to take measurements that represent acceleration relative to an inertial frame and are dependent on the orientation of the sensor unit; a processor arranged to derive a rotational position signal representing the orientation of the rotatable element from the measurements; and a low pass-filter arranged to filter the measurements supplied from the orientation sensor to the processor.

While an accelerometer is suitable to detect the orientation of a rotatable element reliably in benign conditions, in many applications there is a difficulty caused by the change in the forces as the rotatable element rotates being small compared to other forces on the rotatable element from vibration and shocks, e.g. from collisions or impacts. The effect of those forces potentially masks the change in acceleration as the rotatable element rotates, which is desired to be sensed. However, the provision of the low-pass filter allows for removal of the signal from the forces on the rotatable element arising from vibration and/or shocks, without the need to low-pass filter the measurements in the processor, thereby reducing the power consumption of the sensor unit.

Further according to the second aspect of the present invention, there is provided a method corresponding to the operation of the sensor unit.

BRIEF DESCRIPTION OF THE DRAWINGS

Embodiments of the present invention will now be described by way of non-limitative example with reference to the accompanying drawings, of which

DETAILED DESCRIPTION

Figure 1:
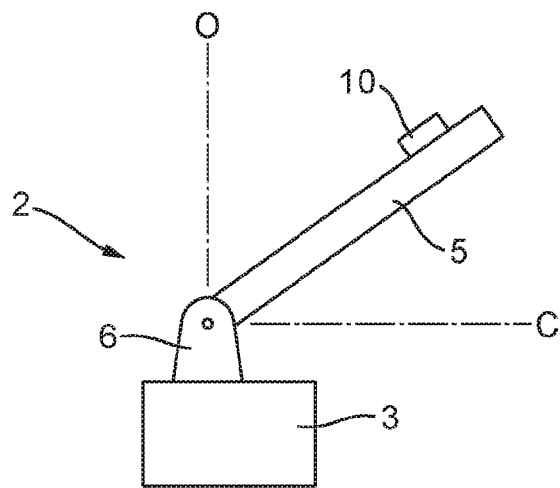
FIG. 1 is a side view of a first type of assembly including a rotatable element and a sensor element.

FIG. 1 shows a first type of assembly 2 comprising a mounting element 3 and a rotatable element 5 rotatably mounted on the mounting element 3 by a hinge 6. The rotatable element 6 is rotatable within a limited range of rotation. In this non-limitative example, the rotatable element 5 extends generally linearly from the hinge 6 and has a limited range of rotation is approximately 90°, extending between an open position O and a closed position C. A sensor unit 10 is mounted on the rotatable element 5.

Figure 2:
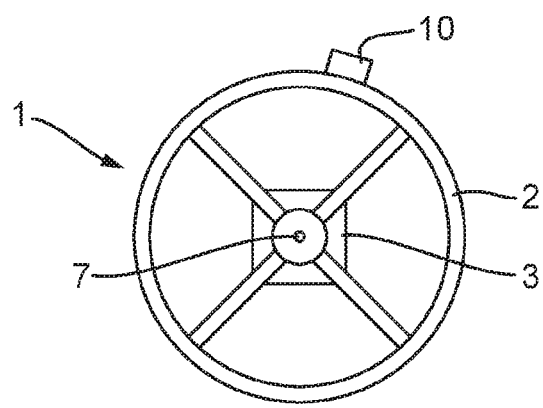
FIG. 2 is a side view of a second type of assembly including a rotatable element and a sensor element.

FIG. 2 shows a second type of assembly 2 comprising a mounting element 3 and a rotatable element 5 rotatably mounted on the mounting element 3 by an axle 6. The rotatable element 6 is rotatable within a limited range of rotation. In this non-limitative example, the rotatable element 5 has a circular shape and has a limited range of rotation that may be one complete turn or plural turns (not necessarily plural complete turns). In FIG. 2 there is illustrated a first position V in which the sensor element 10 is vertically aligned and a second position H in which the sensor element is horizontally aligned, but these are not the limits of the range of rotation. A sensor unit 10 is mounted on the rotatable element 5.

In both of these examples, the rotatable element 2 is mounted on a mounting element 3, but the sensor unit 10 could equally be a rotatable element 2 that is not so mounted, but may in use rotate so that its orientation changes, some examples of which are given below. Thus, more generally the rotatable element 2, may be any rotatable element whose orientation may change.

The sensor unit 10 may be mounted on the rotatable element 5 in any suitable manner. The sensor unit 10 may be mounted on the rotatable element 5 using a mechanical fixing, for example a nut and bold, a clamp or push-fit. The sensor unit 10 may be mounted on the rotatable in an integrated manner. The sensor unit 10 may be mounted on the rotatable element 5 by adhesive.

The mounting arrangement used to mount the sensor unit 10 on the rotatable element 5 may include a seal, for example an O-ring, that may be a resilient member that compresses when the sensor unit 10 is mounted. Suitable materials for such a seal include Viton or a rubber.

The sensor unit 10 may be mounted in a manner allowing it to be retro-fitted to a rotatable element 5. Alternatively, the sensor unit 10 may be mounted on the rotatable element 5 during manufacture of the rotatable element 5.

Plural sensor units 10 may be mounted to a set of plural assemblies 2, to provide sensing of the overall system of assemblies 2.

Figure 3:
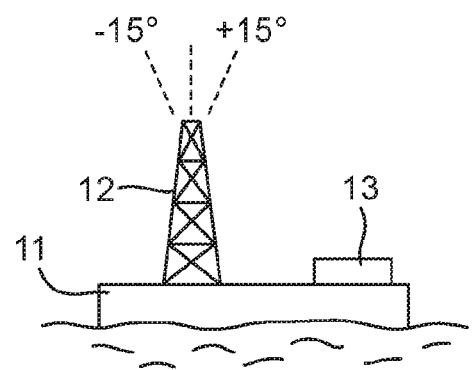
FIG. 3 is a schematic view of a floating platform on which the assembly may be mounted.

The assembly 2 may be mounted on a movable platform. FIG. 3 illustrates a floating platform 11 as an example of a platform on which the assembly 2 may be mounted. The floating platform 11 may be any type of platform including a ship, typically being a platform suitable for offshore oil and gas exploration or drilling operations. The floating platform 11 may include a derrick 12 and other modules 13. Depending on the nature of the rotatable element 5, the assembly 2 may be mounted anywhere on the floating platform, for example on the derrick 12 or the other modules 13.

Although FIGS. 1 and 2 show two types of assembly 2 with rotatable elements 5 of different forms, in general the assembly 2 may include a rotatable element 5 of any type with a limited range of rotation. The assembly 2 may typically have a marine application.

Some non-limitative examples of mountings for the sensor unit 10 will now be described. In each of these examples, the sensor unit 10 comprises a housing 11 which houses the components of the sensor unit 10, as described further below, and a mounting arrangement 14 to which the sensor unit 10 is fixed. In each example, the housing 11 is identical, but the mounting arrangement 14 differs. This simplifies manufacture by allowing the housing 10 and its internal components to be made to a common design, while allowing the type of the mounting arrangement 14 to be selected for different types of rotatable element 5 and different applications.

Figure 4:
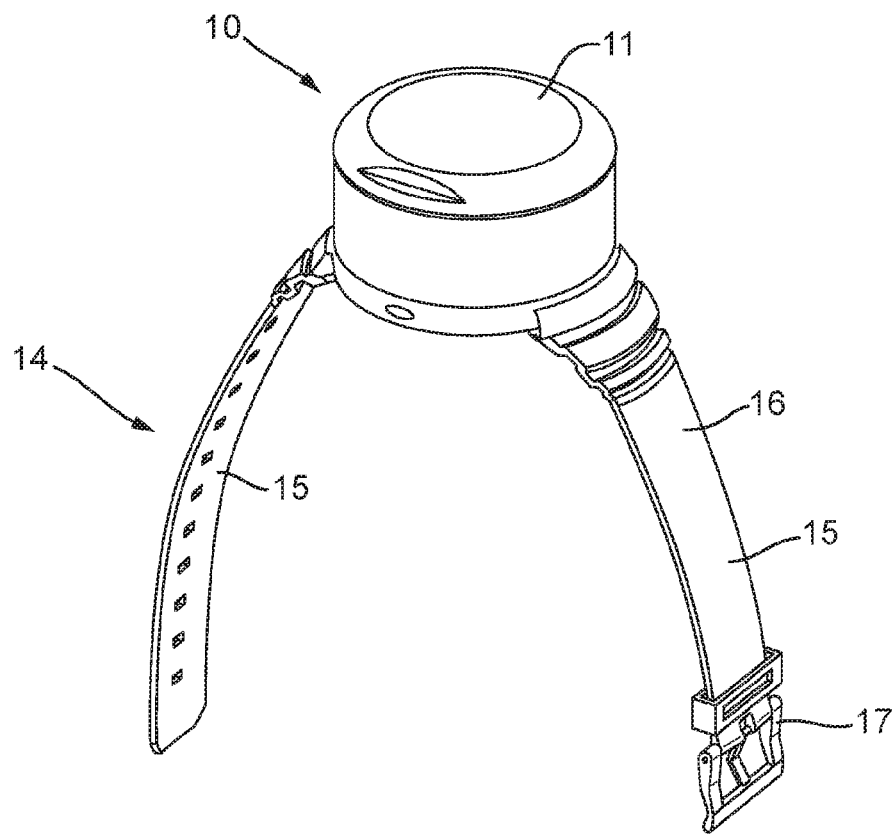
FIGS. 4 to 8 are perspective views of sensor units having different mounting arrangements.

FIG. 4 shows an example in which the mounting arrangement 14 is a strap or sling 15 having two strap portions 16 which may be connected together by a buckle 17 (or other connector such as a clasp) to mount the strap 15 around an object.

Figure 5:
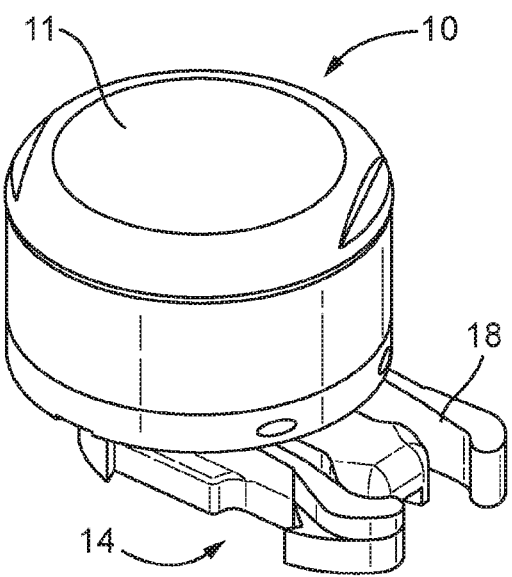

FIG. 5 shows an example in which the mounting arrangement 14 is a mounting clip 18 which may be clipped into a receiving element (not shown) which is mounted to the rotatable element 5.

Figure 6:
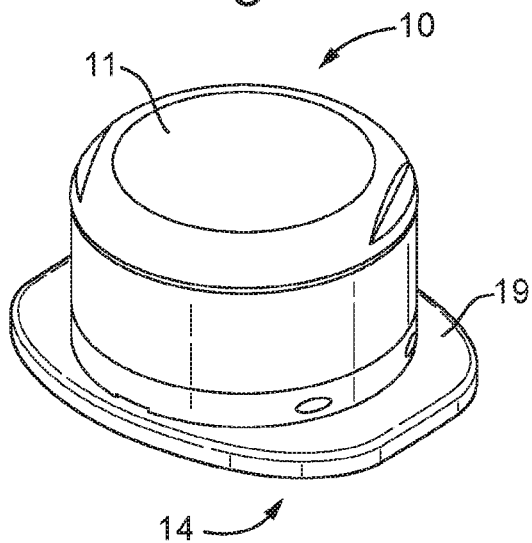

FIG. 6 shows an example in which the mounting arrangement 14 is a base 19 having an adhesive provided on the lower surface (not shown) allowing the sensor unit 10 to be adhesively mounted to the rotatable element 5.

Figure 7:
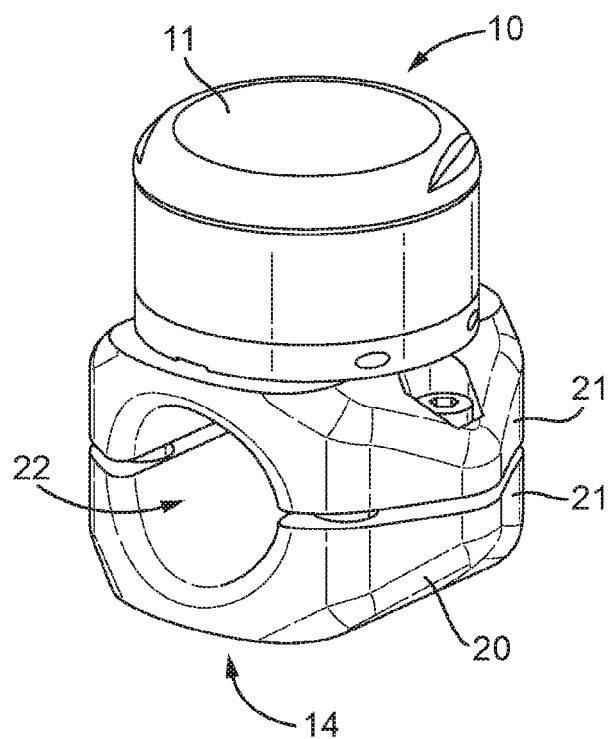

FIG. 7 shows an example in which the mounting arrangement 14 is a clamp 20 comprising two clamp portions 21 having a central aperture 22. The clamp portions 21 may be clamped to an element, for example a pipe, arranged in the aperture 21.

Figure 8:
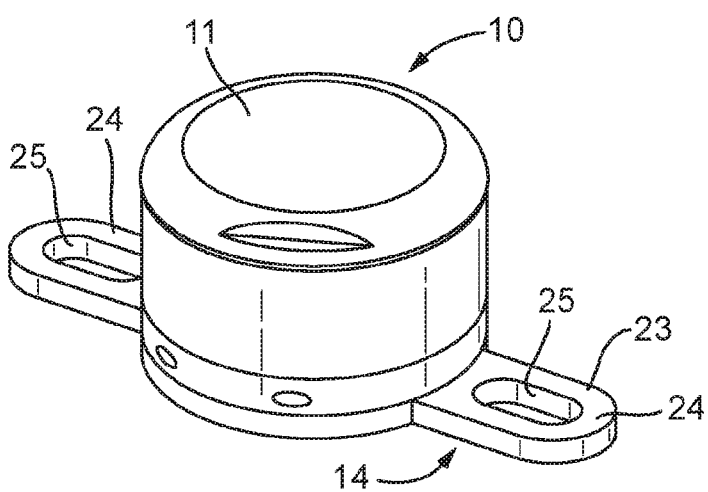

FIG. 8 shows an example in which the mounting arrangement 14 is a base 23 having flanges 24 provided with apertures 25 for receiving standard fasteners, for example a bolt, screw, rivet, or nail, by which the sensor unit 10 may be mounted to a rotatable element.

The sensor unit 20 may be mounted on a wide range of types rotatable elements 2, without limitation to those illustrated in FIGS. 1 and 2. Non-limiting examples of rotatable elements 5 on which the sensor unit 10 may be mounted include:

hatches, handles, wheels or watertight doors used to provide marine integrity of compartments around a vessel, so as to monitor their position and condition to demonstrate the vessel is secure;

wheel valves in a marine application, or any other engineering application;

valves or pressurized lines (e.g. hydraulic, pneumatic) in applications where monitoring of position and other aspects like pressure, flow and temperature may be critical;

hinges, gates, doors, shutters and/or brackets, feedback on whose orientation or status may be required for integrity or safety monitoring;

elevators used to handle pipe which may become misaligned between their top and bottom rails;

latches of fingerboard latch assemblies;

claws used to clamp or secure tubulars during pipe handling operations, to ensure position (open/closed state) is known, and to monitor other characteristics such as strain, vibration and temperature;

clamps used to secure large, heavy pieces of equipment such as blow out preventers, skids, trucks, dollies or pumps;

bails used to hold tubulars in the draw-works or top drive;

cranes, or arms of cranes, to provide feedback on orientation and to monitor for safe operation and/or operation within design parameters, e.g. lifting loads in high seas;

container brackets and/or doors, to provide data on security and integrity of cargo;

draw-works, crown, top-drive or blocks used to apply load and torque to tubulars while drilling, so as to monitor their condition and position, vibration, oscillation, wear and temperature;

straps, slings or brackets used to lift loads, or secure objects, to monitor them for orientation, vibration or oscillation and provide an alarm or feedback in the event of unsafe operation, dangerous conditions, excessive sway, fraying of straps or loads exceeding specified mass, e.g. integration of a monitoring device to monitor orientation of straps while lifting or securing loads;

Some non-limiting examples of applications where the sensor unit 10 is mounted on different rotatable elements 5 are as follows.

Figure 9:
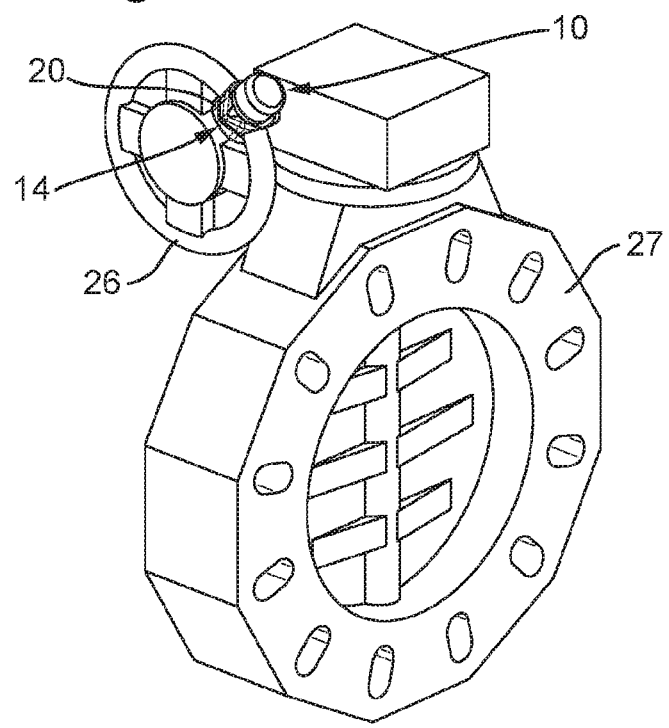
FIGS. 9 and 10 are perspective views of a sensor unit mounted on a valve hand wheel.
Figure 10:
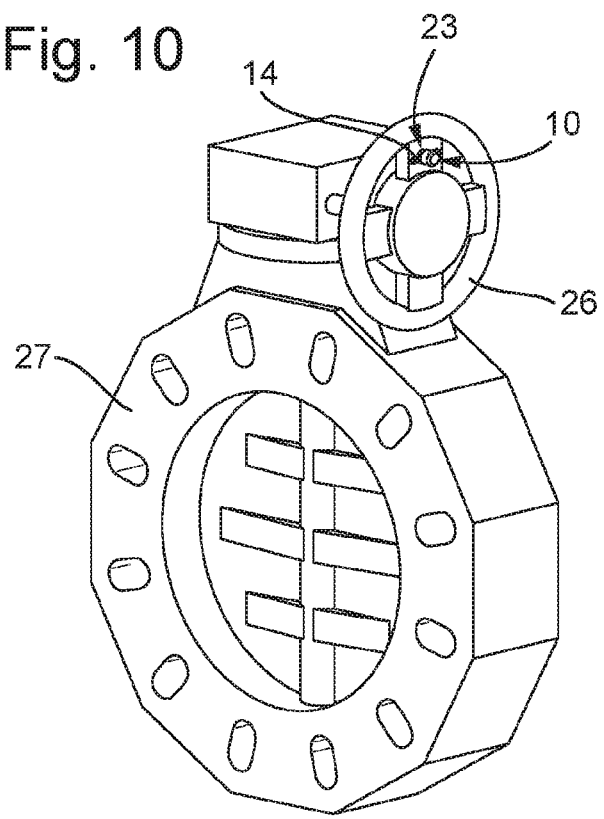

FIGS. 9 and 10 illustrate two examples of a sensor unit 10 mounted on a hand wheel 26 which is used to operate a valve 27. In the example of FIG. 9, the sensor unit 10 has a mounting arrangement 14 that is a clamp 20 of the type shown in FIG. 7. In the example of FIG. 10, the sensor unit 10 has a mounting arrangement 14 that is a base 23 of the type shown in FIG. 8. In these examples, the illustrated valve 27 is a butterfly valve, but in general the valve 27 could be any type of valve controlled by a hand wheel, for example a ball valve, gate valve, globe valve, etc.

Figure 11:
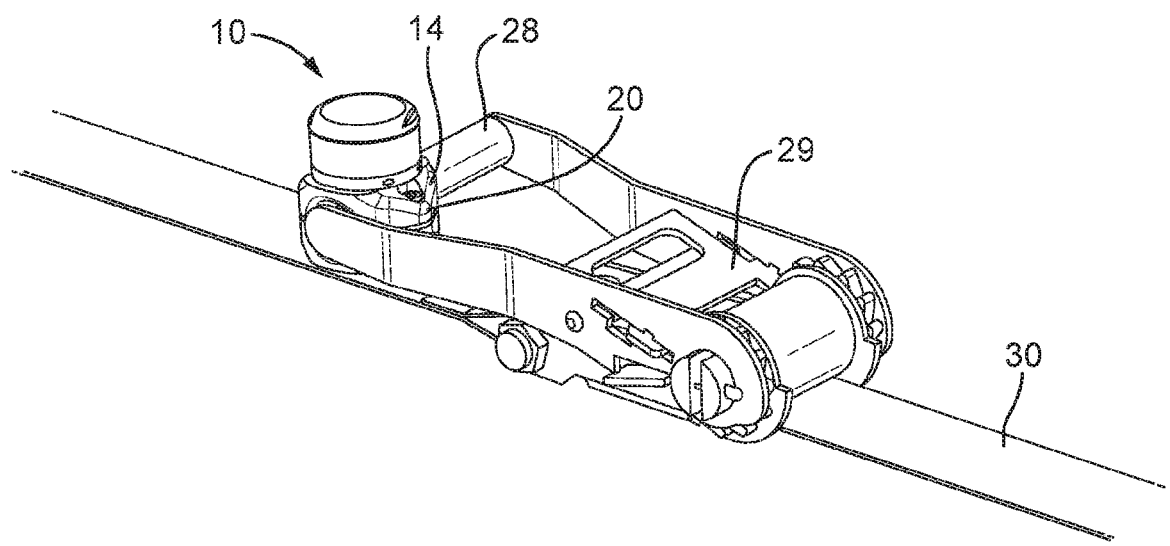
FIG. 11 is a perspective view of a sensor unit mounted on a ratchet strap.

FIG. 11 illustrates a sensor unit 10 mounted on the handle 28 of a ratchet mechanism 29 of a ratchet strap 30. In this example, the sensor unit 10 has a mounting arrangement 14 that is a clamp 20 of the type shown in FIG. 7.

Figure 12:
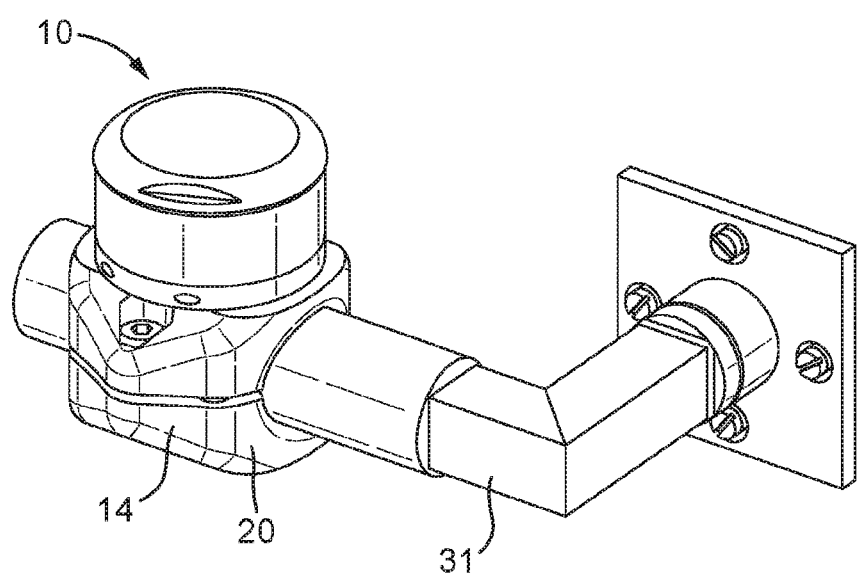
FIG. 12 is a perspective view of a sensor unit mounted on a door handle.

FIG. 12 illustrates a sensor unit 10 mounted on a door handle 31. In this example, the sensor unit 10 has a mounting arrangement 14 that is a clamp 20 of the type shown in FIG. 7. Similarly, the sensor unit 10 could be mounted on other handles such as a window or hatch handle.

Figure 13:
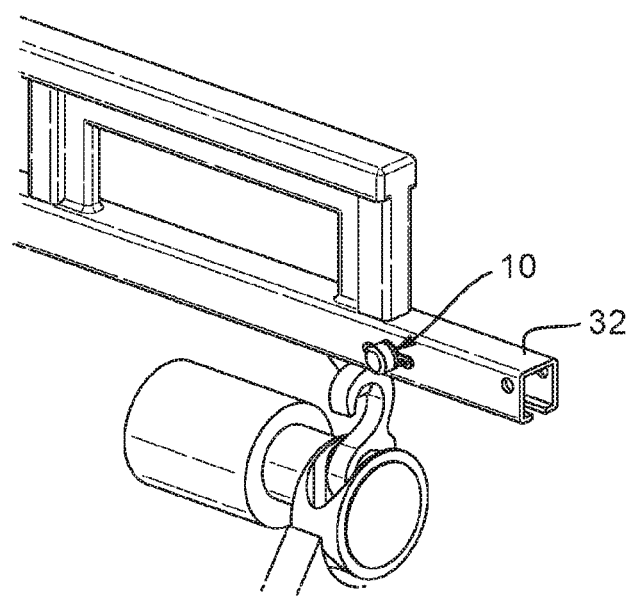
FIG. 13 is a perspective view of a sensor unit mounted on a crane arm.

FIG. 13 illustrates a sensor unit 10 mounted on a crane arm 32. In this example, the sensor unit 10 has a mounting arrangement 14 that is a base 23 of the type shown in FIG. 8.

Figure 14:
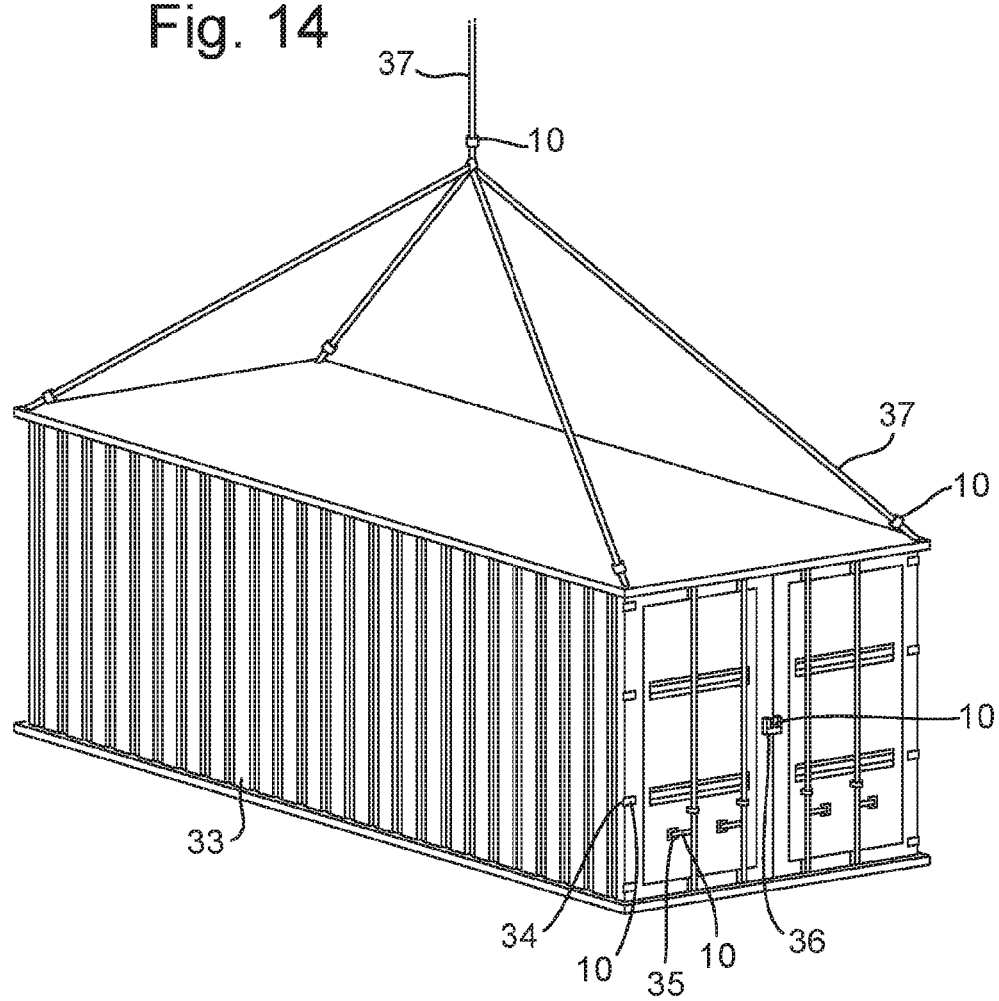
FIG. 14 is a perspective view of plural sensor unit mounted on a shipping container.

FIG. 14 illustrates plural sensor units 10 mounted on a shipping container 33 that is the load of a crane (not shown). Some of the sensor units 10 are mounted to rotatable elements of the shipping container 33 itself, in particular to a hinge 34, a handle 35, and a lock 36. Some of the sensor units 10 are mounted to the crane ropes or slings 37. Similarly, sensor units 10 could be mounted to any other load of crane. The orientation of the crane ropes 37 and the container 33 itself changes as the crane is operated and such rotation may be monitored by the sensor unit 10.

Figure 15:
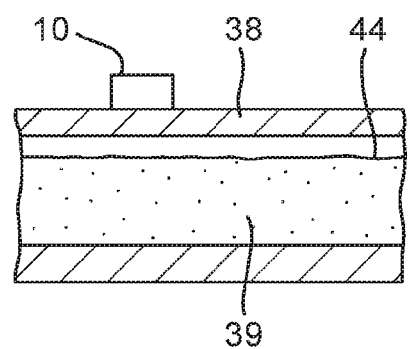
FIG. 15 is a cross-sectional view of a sensor unit mounted on a pipe.

FIG. 15 illustrates a sensor unit 10 mounted on a pipe 38 that may contain a fluid 39 that flows along the pipe 38. In general, the pipe 38 may be of any size and type, and the fluid 39 may be of any type, for example a fluid in oil and gas extraction or production, which may be an emulsion. The orientation of the pipe 38 may change in use, and such rotation may be monitored by the sensor unit 10.

Figure 16:
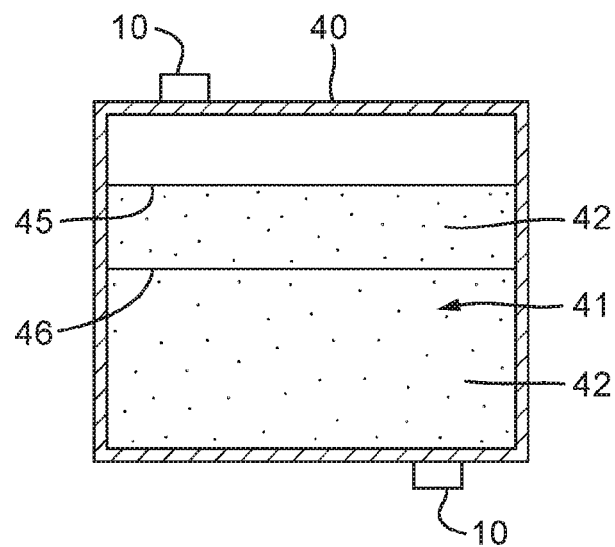
FIG. 16 is a of cross-sectional view of sensor units mounted on a tank containing fluids.

FIG. 16 illustrates plural sensor units 10 mounted on a container 40 containing fluids 41, which in this non-limitative example comprises two components 42 and 43 which are immiscible. In general, the container 40 may be any type of container, and the fluids 41 may be of any type. For example, the container 40 may be a container used in oil and gas extraction, production or storage. The container 40 may be a separator.

Figure 17:
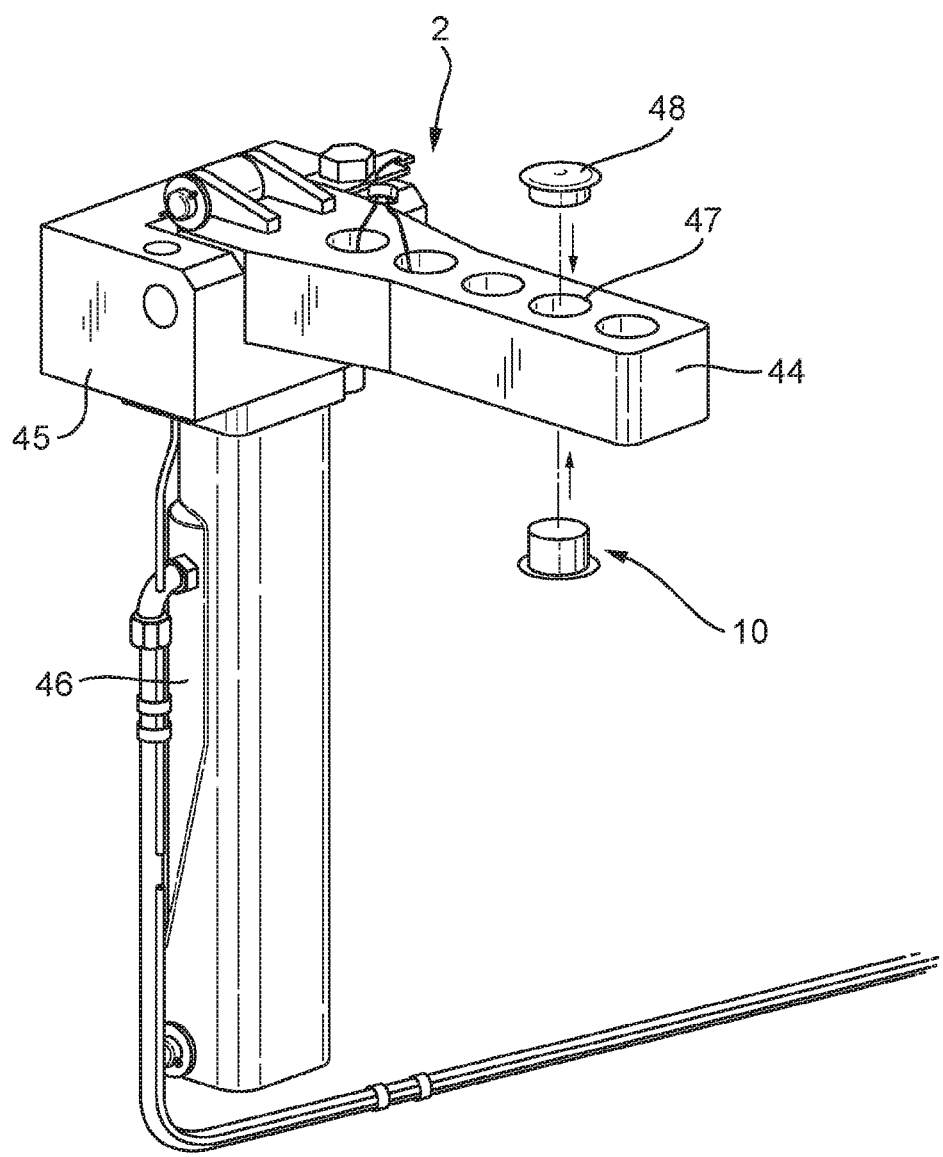
FIG. 17 is a perspective view of the fingerboard latch assembly having a sensor unit mounted thereon.

FIG. 17 illustrates a sensor unit 10 mounted on a latch 44 of an assembly 2 which is a fingerboard latch assembly. Plural such assemblies may be mounted along a fingerboard 101 to retain a tubular of any type, for example a drill pipe, drill collar or casing. The latch 44 is rotatably mounted on a bracket 45 and is an example of an assembly of the first type shown in FIG. 1. The latch 44 is actuated by a pneumatic cylinder 46. The sensor unit 10 is mounted to the latch 44, in this example within an aperture 47 in the latch 44, the sensor unit 10 being retained therein by a retaining member 48 that engages with the sensor unit 10. Further details of possible configurations of the housing 11 to allow mounting on a latch 105 are disclosed in PCT/GB2017/051972 to which reference is made.

Figure 18:
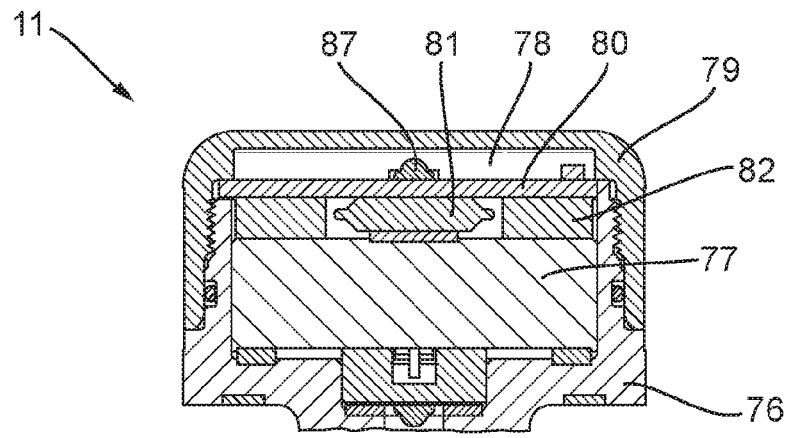
FIG. 18 is a cross-sectional view of the housing of the sensor unit.
Figure 19:
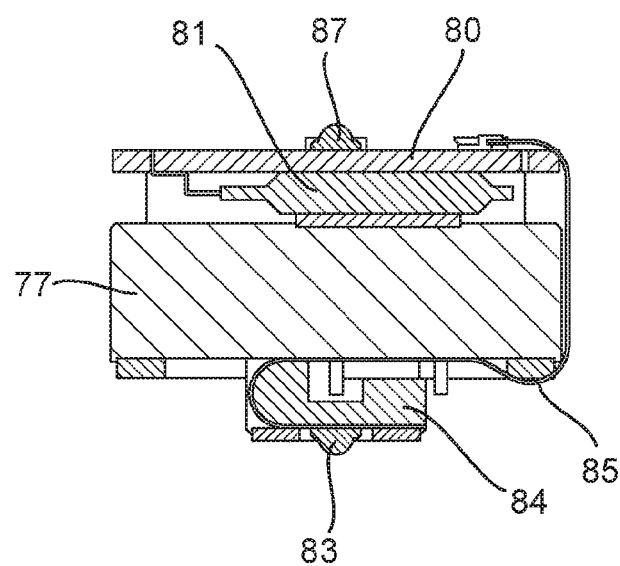
FIG. 19 is a cross-sectional view of the electronic components of the sensor unit, taken perpendicular to the cross-sectional view of FIG. 17.

The sensor unit 10 will now be described in more detail. As shown in FIGS. 18 and 19, the housing 11 houses a sensor circuit 50 as will now be described.

The construction of the housing 11 is as follows.

The housing 11 comprises a base 76 and a cap 79 that is fixed over the base 76.

The base 76 and the cap 79 form an enclosure 78 in which the electronic components of the sensor circuit 50 are contained. The enclosure 78 seals the electronic components and has no external electrical connections which could compromise the integrity. The enclosure 78 is resistant to fluids and ultraviolet light to suitable standards, for example the IP67 standard.

The enclosure 78 contains a battery 77 that acts as a power source for the sensor circuit 50. A circuit board 80 on which the sensor circuit 50 is formed is provided above the battery 77. A capacitor 81 is fixed to the circuit board 80 adjacent the battery 77, and a first spacer 82 beside the capacitor 81 spaces the circuit board 80 from the battery 77.

A first light emitter 83, which is typically a light emitting diode, is arranged at the bottom of the housing 11, beneath the battery 77, spaced from the battery 77 by a second spacer 84. The first light emitter 83 is a light source that may be used as described further below. A flexible circuit 85, as best shown in FIG. 19, connects the first light emitter 83 to the circuit board 80.

Additionally or alternatively, a second light emitter 87, which is typically a light emitting diode, is arranged at the top of the housing 11, on top of the circuit board 80. The cap 79 is sufficiently thin or transparent thin to allow output of light so that the second light emitter 87 forms an additional or alternative light source from the first light emitter 83.

The housing 11 may be fabricated from any suitable material, typically a non-metallic material. The housing 11 may be made from a tough, durable material to withstand shock, vibration, temperature extremes, ice, direct sunlight, UV degradation and washing with a high-pressure jet of water at over 200 Psi. The housing 11 may be made from any suitable material. Suitable materials include, without limitation: carbon fiber; fiberglass (glass reinforced plastic); a fibrous material such as Kevlar; a plastic, for example Polyether ether ketone (PEEK) or any type of Polyaryletherketone (PAEK); an elastomer, for example a rubber; or other engineering thermoplastics. The material may be a reinforced material, for example PEEK reinforced with carbon fiber, or fiberglass. The material may be a composite.

The housing 11 may also incorporate at least one non-metallic liner. Such a liner may provide compressive engagement between the sensor unit 10 and it's mounting to accommodate tolerances for the dimensions of the rotatable element 5 which can be broad, thereby increasing friction and integrity. Such a liner may provide, and/or sealing, for example to keep out oils and debris. Such a liner may be an O-ring or a sleeve. By way of example of such a liner in the second configuration of the sensor unit 10, the housing 11 comprises liners in the form of an O-ring.

The material of the liner may be of a type known to be suitable for use as a lining in oil and gas applications. Suitable materials for the non-metallic lining can include: polyisoprene, styrene butadiene rubber, ethylene propylene diene monomer rubber, polychloroprene rubber, chlorosulphonated polyethylene rubber, 'Viton', nitrile butadiene rubber. This list is non-limitative and other elastomers could be used. The material may also be a mixture of these and/or other materials.

In the above example, a battery 77 is provided as a power source. More generally the battery 77 may be replaced by any type of standalone power source known in the art that is capable of providing power to the sensor unit 10 may be provided. For example the power source may comprise a battery, solar cell, fuel cell, supercapacitor or capacitor. The power source may optionally comprise an energy harvesting device that is configured to harvest energy from the assembly 2. For example the power source may be configured to harvest energy from the motion, shock or vibration of the rotatable element 5. The power source may be provided integral with the sensor unit 10, or removably attached to the sensor unit 10. A sensor unit 10 that is easily maintained may thus be provided.

In an example where the power source is a battery 77, preferably the battery 77 has long life characteristics. The battery 77 is ideally compact in format to fit within the sensor unit 10. To avoid frequent replacement of the sensor unit 10, the battery 77 ideally will have sufficient capacity to power the sensor circuit 50 for tens of thousands of rotational cycles over several years (e.g. 20,000 cycles and five years). Optionally, the battery 77 may be a Lithium Thionyl Chloride battery that has been selected and configured to last the lifetime of the equipment.

Figure 20:
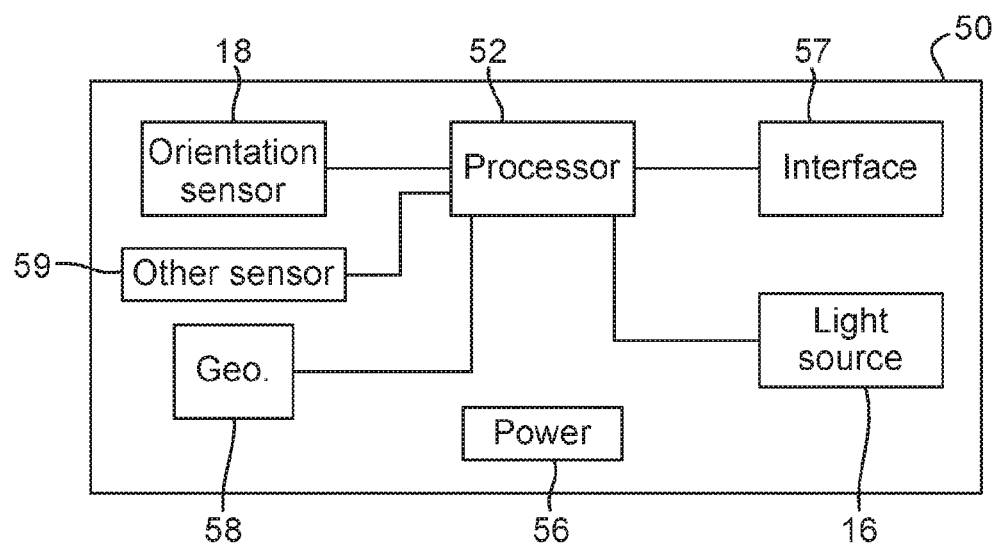
FIG. 20 is a diagram of a sensor circuit of the sensor unit.

The sensor circuit 50 may be arranged as shown in FIG. 20 as will now be described.

The sensor circuit 50 includes an orientation sensor 18 (or plural orientation sensors), a processor 52, a wireless communication interface 57, the first light emitter 83 and/or second light emitter 87, which act as light sources, and a power source 56, that may be the battery 77 in the above description or any other known type of power source as discussed above.

The orientation sensor 18 takes measurements that are dependent on the orientation of the sensor unit 10. In general, the orientation sensor 18 may be any type of sensor suitable for detecting the orientation of the rotatable element 5. The sensor 18 may preferably be a low power sensor such as a MEMS sensor, which may be for example configured as an inclinometer, accelerometer, magnetometer or gyroscope. Examples of alternative types of sensor that could be used include: tilt ball sensor; infrared; laser; optical, digital imaging, acoustic; capacitive; magnetic, antenna polarization or Hall Effect sensors. As the sensor unit 10 is mounted on the rotatable element 5, the sensor 10 may be of a type that is relatively simple and of low power compared to a sensor mounted on the mounting element 3 that indirectly senses the rotatable element 5. Thus, the sensor unit 10 is inexpensive and capable of being run where the power source 56 has limited capacity, for example being a battery.

The processor 52 is supplied with the measurements from the orientation sensor 18 and processes them. The processor 52 derives, from the measurements, a rotational position signal representing the rotational position of the rotatable element 5 with respect to the mounting element 3. In general terms, this is possible because the sensor unit 10 is mounted in the rotatable element 5 and so the orientation of the sensor unit 10 is indicative of the orientation of the rotatable element 5.

In the example of FIG. 1 and other examples where the range of rotation is less than a complete turn, then the rotational position is uniquely identified by the orientation indicated by the measurements from the accelerometer 53.

In the example of FIG. 2 and other examples where the range or rotation is a complete turn or more, then the rotational position may be derived from the orientation indicated by the measurements from the accelerometer 53 to provide the rotational position within a turn and from the history of the orientation indicated by the measurements from the accelerometer 53 to derive the rotational position as between different turns, for example by determining and counting the number of turns indicated by the changing orientation.

The rotational position signal may represent the value of the present rotational position of the rotatable element 5 across its range of movement with respect to the mounting element 3.

Alternatively, the rotational position signal may simply represent that the present rotational position of the rotatable element 5 is an open state corresponding to one limit of the range of rotation, a closed state corresponding to the other limit of the range of rotation, or an intermediate state corresponding to any position intermediate the limits of the range of rotation. For example the open state and the closed state may be taken to correspond to the rotatable element 5 being within a predetermined range of angles, for example 6 degrees, of the respective limits of the range of rotation. In this case, the open and closed state may be derived by applying a suitable threshold condition on the rotational position indicated by the successive measurements. In this case, a rotational position signal that represents the value of the rotational position of the rotatable element 5 may or may not be explicitly derived, but the threshold condition is related to the measurements on the basis of similar geometrical calculation.

The wireless communication interface 57 provides wireless communication and may be a radio communication interface arranged to transmit signals using radio frequency electromagnetic waves. A frequency may be selected that has a wavelength that is suitable for the field of use. The frequency selected should not interfere with marine communications equipment, Optionally, the frequency selected may be between 2 and 3 GHz.

As an alternative to using radio frequency EM waves, the wireless communication interface 57 may employ any other form of wireless communication for communicating the orientation signal, for example acoustic, microwave, ultrasonic or optical communication.

The wireless communication interface 57 may be unidirectional and merely transmit information from the sensor unit 10, or may be bidirectional and transmit and receive information. The wireless communication interface 57 may implement any suitable transmission protocol.

The wireless communication interface 57 is used to wirelessly communicate the rotational position signal to a monitoring system 65 described further below, under the control of the processor 52.

In addition, the processor may associate metadata with the rotational position signal. Such associated metadata may be wirelessly communicated with the rotational position signal.

The metadata may be generated by the sensor units 10 monitoring rotatable elements 5 throughout an array of assemblies 2. The metadata may include includes time information, for example date and time. The metadata may include rotatable element characteristics such as sensor identity, rotatable element identity, number of rotatable element cycles, count of rotatable element being in open position, count of rotatable element being in closed position, rotatable element speed, rotatable element acceleration, sensor battery level, orientation sensor signal level, signal polarization, antenna signal strength, sensor location, or self-diagnostic information, for example relating shocks or vibration or recorded anomalies or warnings logged.

The sensor circuit 50 may include a geolocation unit 58 arranged to detect the location of the sensor unit 50, for example a global position system (GPS) unit. In this case, the metadata may include the location detected by the geolocation unit 58. This can be useful to indicate the location of plural sensor units 10 arranged across an array of assemblies 2.

The sensor circuit 50 may include a further sensor 59, which may in general be any type of sensor that is used to monitor another characteristic of the rotatable element 5 to be monitored in parallel with its rotational position. More than one such further sensor 59 may be included.

By way of non-limitative example, the further sensor 59 may be any of the following:
 a sensor that senses the contents of a rotatable element 5 which is a container or pipe, for example a sensor that senses material properties or a sensor that measures a level of a surface or interface;
 a load cell or a strain gauges etc.;
 a proximity sensor, that may optionally be an optical sensor;
 a pressure sensor;
 a temperature sensor;
 a light intensity sensor;
 a sensor;
 a corrosion sensor;
 a hardness sensor;
 a magnetic sensor;
 a ball-bearing races
 a surface wear sensor Such a further sensor 59 may provide a combined condition monitoring device that operates wirelessly in harsh environments such as a floating platform used for marine transportation, hydrocarbon production, floating production and storage offshore (FPSO), drilling or exploration;

Such a further sensor 59, optionally in combination with the geolocation unit 58, may provide monitoring of location, condition, integrity, security and orientation of cargo, e.g. ISO containers, retaining brackets, seals and doors.

Such a further sensor 59 may monitoring of fluids including composition of fluids (oil, solids and water), pH, conductivity, salinity, electro-magnetism, magnetic resonance, viscosity, density and surface tension, e.g. monitoring of fluid level (which may be necessary when accurately measuring composition) in tanks, separators, pipes, conduits, manifolds, shaker header boxes, channels or other vessels with respect to orientation of a floating platform 11.

By way of example in the case of a sensor unit 10 mounted on a pipe 38 as shown in FIG. 15, the further sensor 59 may monitor the level 44 or composition of the fluid 39, which may vary with the orientation of the pipe 38.

By way of example in the case of a sensor unit 10 mounted on a container 40 as shown in FIG. 16, the further sensor 59 may monitor the level of a surface 45 and/or an interface 46, which may vary with the orientation of the container 40. This may be important, for example, in storage and production of oil and water.

The sensor circuit 50 system may include other electronics and processing capability, including memory for storing software, firmware, data and records.

As an alternative to the wireless communication interface 57, any other method of communicating the rotational position signal may be used.

The first light emitter 83 and/or second light emitter 87 act as one or more light sources as will now be described. In general, the provisional of light sources is optional, but the light sources may be provided, in addition to, or as an alternative to, the use of the wireless communication interface 57 for communication of the rotational position signal and other information, such as the metadata.

In general, other forms of light source may be also used, as an alternative to the first light emitter 83 and/or second light emitter 87. The light sources may be provided in any location in the sensor unit 10 that is visible or has a line of sight in use The sensor unit 10 may be mounted so that the light sources are directed downwards in the case of assemblies 2 that are mounted in a high location, so that they are visible from below. It also keeps them cleaner, reducing the risk of obscuring the output light.

The light sources may emit light in any suitable wavelength band, for example infrared, visible or ultraviolet.

The light output by the one or more light sources is modulated in accordance with the orientation of the rotatable element 5 sensed by the sensor 18, under the control of the processor 52. Thus a reliable indication of the orientation of the rotatable element 5 may be provided.

Modulating a light source to represent the orientation of the rotatable element 5 allows for a wireless sensor unit to be provided that is suitable for use in remote locations without the need to make an electrical connection. The light sources may provide instant indication of position, security or condition, of the rotatable element or monitoring device.

The modulation of the light sources may be implemented in a number of ways, some non-limitative examples being as follows.

In the simplest case, the light sources may be in an on or off state corresponding to two different rotational positions of the rotatable element 5, e.g. open and closed positions. For example, a lit light source may identify that the rotatable element 5 is in a closed position, and an unlit light source may indicate that the rotatable element 5 is in an open position.

Alternatively, the modulation may be a change in illumination timings (e.g. flashing rate) of the light sources. For example, two (or optionally more) illumination timings may indicate two (or optionally more) rotational positions of the rotatable element 5, for example a closed position and an open position (and optionally one or more other intermediate rotational positions).

In one example, the output of the light sources is flashed on and off, but modulated by varying the period. This is advantageous because power is saved compared to a continuous output of light.

In this case, the time for which the light source is flashed on in each period, in each of the different illumination timings, may be sufficiently long to be detected by a human observer or camera system, depending on which is used to monitor the output. For a human observer, the time for which light source is flashed on is sufficiently long to be visible taking account of the persistence of vision, for example at least 5 ms, preferably at least 8 ms, at least 10 ms, or at least 20 ms. For a camera system, the time for which light source is flashed on is sufficiently long to be reliably detected thereby, taking account of the camera and processing technology used.

To minimize power consumption, the time for which light source is flashed on may be the same for each modulation, i.e. irrespective of the length of the period. In that case, modulation may be achieved by changing the time for which light is not output (i.e. for which the light source is off). For example, the time for which light is not output may be 48 ms for one orientation of the rotatable element 5 and may be 480 ms to indicate another orientation of the rotatable element 5.

Alternatively, the modulation may be a change in the color of light output by the light sources. For example, two (or optionally more) colors may indicate two (or optionally more) rotational positions of the rotatable element 5, for example a closed position and an open position (and optionally one or more other intermediate rotational positions). The modulation of the light output by the light sources may be monitored by a person or remotely monitored via a camera system such as closed circuit television. Image processing may be used to provide automated monitoring.

The modulation of the light output by the light sources 10 may also represent information in addition to the sensed rotational position of the rotatable element 5.

In one example, modulation as between the light sources of different assemblies 2 may additionally represent the spatial location of the rotatable element 5. This is advantageous when sensor units 10 are mounted on plural assemblies 2 of an array, as the modulation may then indicate the rotational position and the spatial location of the rotatable elements 5 within the array. For example, light sources of different sensor units 10 may output light of different colors in order to provide differentiation between the spatial locations of the assemblies 2 to which the sensor units 10 are mounted.

In another example, the modulation may indicate maintenance information, for example information about the motion of the rotatable element 5 that is indicative of wear, such as an excessive time for movement between open and closed positions, or a significant bounce of the rotatable element 5 on reaching the open or closed position.

Where additional information to the orientation of the rotatable element 5 is represented, then the orientation of the rotatable element 5 and the additional information may be represented by different types of modulation, for example representing orientation of the rotatable element 5 by modulation of illumination timing and indicating maintenance information by modulation of color, for example green light indicating a positive condition and red light indicating the need for maintenance.

As an alternative, the sensor unit 10 could be adapted to be mountable on the mounting element 3. In that case, the sensor unit 10 is in a fixed location relative to the mounting element 3 and so orientation sensor 18 would be replaced by a sensor that detects the orientation of the rotatable element 5 by detecting the proximity of the rotatable element 5 as it rotates with respect to the mounting element 3 and hence the sensor unit 3.

Figure 21:
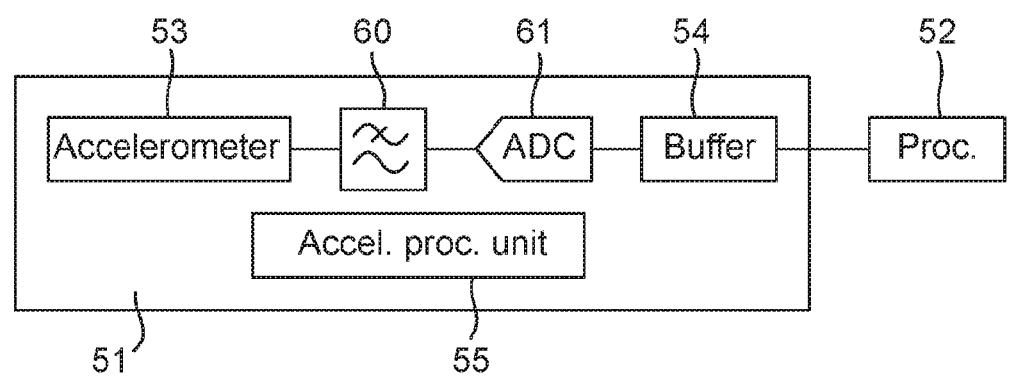
FIG. 21 is a detailed diagram of an accelerometer chip in one implementation of the sensor circuit.

By way of example, the orientation sensor 18 may be implemented by an accelerometer 53 in an accelerometer chip 51 that is illustrated in FIG. 21. The accelerometer chip 51 is arranged as follows.

The accelerometer 53 may be a microelectromechanical systems (MEMS) device. Such a type of device is advantageously reliable and of low cost.

The accelerometer chip 51 further includes a low-pass filter 60, and ADC (analog-to-digital converter 61 and a buffer 54 and an accelerometer processing unit 55. The accelerometer processing unit 55 performs basic control functions for the accelerometer chip 51.

The low-pass filter 60 filters the measurements output from the accelerometer 53 which is the orientation sensor in this implementation. As the measurements are analog, in this example the low-pass filter 60 is an analog device.

The filtered measurements are supplied from the low-pass filter 60 to the ADC 61 which analog-to-digital converts the filtered measurements. The resultant digital measurements are supplied to the buffer 54, which buffers measurements before supply to the processor 42, as described below.

The provision of a low-pass filter 60 is not commonplace in an accelerometer chip, but use of the accelerometer chip 51 that does include a low-pass filter 60 is advantageous in the present application for the following reasons.

In general terms, an accelerometer is suitable to detect the orientation of the rotatable element 5 reliably in benign conditions by detecting the direction of acceleration due to the earth's gravitational field. However the change in the forces as the rotatable element 5 moves between the two positions shown in FIGS. 1 and 2 (i.e the open position O and the closed position C in FIG. 1 and the first position V and the second position H in FIG. 2) is small (1 g) compared to other forces on the rotatable element 5 from vibration (which may be up to 4 g) and shock of collisions or impacts (which may be tens of g). The effect of those forces potentially masks the change as the rotatable element 5 moves which is desired to be sensed.

However, it has been appreciated that the effect of such forces is most significant at relatively high frequencies. For example, vibrational forces may be less than 0.5 g at, say, 3 Hz, but around 4 g at, say, 25-100 Hz.

Typical low cost accelerometers, for example using MEMS technology, have a relatively high natural frequency, typically of the order of 1 kHz. Such accelerometers will respond to the high frequency vibration. In many applications, that is an advantage. As a result, such accelerometers may be designed to have a sampling rate of greater than double the natural frequency to avoid the risk of aliasing.

To remove the signal from the forces on the rotatable element 5 arising from vibration and shock of pipe collisions, one approach would be to apply digital low pass filtering in the processor 42 when it processes the measurements. However that would significantly increase the power consumption, as each ADC conversion consumes power. So use of a high sampling rate would limit the life of the power source 56 and/or require a large power source 56, limiting how small the sensor unit 10 could be made.

Another approach which might be considered is to use an accelerometer with a lower natural frequency. In principle, this would have the advantage of allowing a lower sampling frequency, but it would also have the disadvantage of a longer recovery time from the shock loading. Moreover, accelerometers with a suitably low natural frequency are less easily available, particularly as small size, low cost, low power devices.

Accordingly, the provision of the low-pass filter 60 allows for removal of the signal from the forces on the rotatable element 5 arising from vibration and shock of collisions or impacts, without the need to low-pass filter the measurements in the processor 42. By providing the low-pass filter 60 before the ADC 61, the high frequency noise can be removed with a limited power consumption in the ADC 61. Thus, the arrangement of the accelerometer chip 51 allows a robust system to be designed with a reduced ADC sampling frequency.

The cut-off frequency (which may be defined for example as a 3 dB corner boundary in the frequency response at which the signal begins to be reduced) of the low-pass filter 60 may be chosen to attenuate at least some of the noise while passing signal representing the motion of the rotatable element 5 with a response time that is sufficiently short to provide useful monitoring. Typically, the cut-off frequency may be at most 50 Hz, preferably at most 25 Hz. In one application, a cut-off frequency of 12.5 Hz is chosen. Cut-off frequencies of such orders are low enough to reduce power consumption while still providing a useful measurement signal. A lower value down to 1 Hz may provide further benefits in reducing the impact of vibration, but would introduce a small delay.

Ideally, the low-pass filter 60 may be nonlinear such that the effect of high shock loads on the accelerometer 53 from pipes is reduced. For example, measurements may be gathered for 200 ms, that is 10 samples at 50 Hz. The two largest and two smallest values may rejected and the remaining 6 samples averaged. This further helps remove the transient from pipe shocks on the rotatable element 5.

Ideally, the accelerometer chip 51 is chosen to have a relatively low power consumption. By way of example, the accelerometer chip 51 may be an ADXL363 or alternatively an ADXL362, both commercially available from Analog Devices™.

Figure 22:
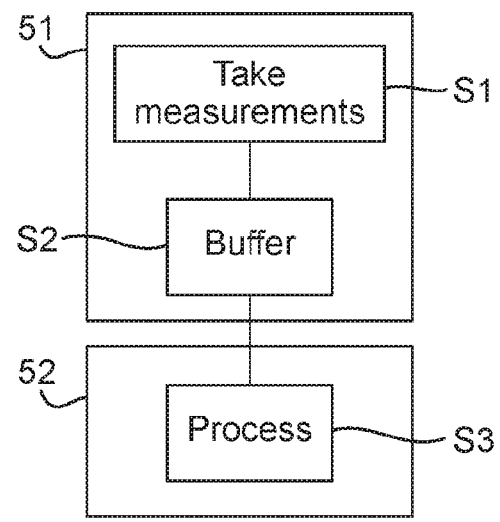
FIG. 22 is a flow chart of a sensing method performed by the sensor circuit.

The sensor circuit 50 operates as shown in FIG. 22, wherein steps S1 and S2 are performed in the accelerometer chip 51 and step S3 is performed in the processor 42.

In step S1, the accelerometer 53 takes measurements representing acceleration relative to an inertial frame along two axes perpendicular to the rotational axis of the rotatable element 5. These measurements are therefore dependent on the orientation of the sensor unit 10 as the rotatable element 5 rotates.

This is illustrated, for example, in FIGS. 1 and 2 wherein the two axes X and Z along which measurements of acceleration are taken by the accelerometer 42 are shown for the two positions illustrated therein (i.e. the open position O and the closed position C in FIG. 1 and the first position V and the second position H in FIG. 2). The axes X and Z rotate with the rotatable element 5. Thus, in the open position O in FIG. 1 and the first position V in FIG. 2, the acceleration along the axis X is zero and the acceleration along the axis Z is g, the acceleration due to gravity, whereas in the closed position C in FIG. 1 and the second position H in FIG. 2, the acceleration along the axis X is g and the acceleration along the axis Z is zero. Similarly at orientations intermediate the two positions illustrated in FIGS. 1 and 2, the accelerations along the axes X and Z vary as the orientation varies with respect to gravity. Consequently, the measurements of acceleration along the axes X and Z are represent the orientation of the sensor unit 5.

The measurements of acceleration along both the axes X and Z are used in combination by the processor 42 to derive the orientation of the sensor unit 10 using a simple geometrical calculation (subject to the movement of the mounting element 3 as discussed below). As an alternative, a measurement of acceleration along a single one of the axes X and Z could alternatively be used to derive the orientation of the sensor unit 10, but this is not preferred as it is less accurate.

The accelerometer 53 therefore functions as an orientation sensor. As an alternative, the accelerometer 53 could be replaced by any suitable alternative form of orientation sensor, for example a gyroscope or magnetometer. However, an accelerometer 53 provides the advantage of having a relatively lower power consumption, which is important in the present application as it may be burdensome to change the power source 56, given the inaccessible location of the sensor unit 10 in normal use on the assembly 2.

In step S2, the buffer 54 buffers a series of recent measurements taken by the accelerometer 53 over a predetermined period of time and supplied to the buffer 54 through the low-pass filter 60 and the ADC 61. The processor 42 processes the measurements in steps S3 as follows.

In general terms, in step S3 a rotational position signal which represents the rotational position of the rotatable element 5 with respect to the mounting element 3 is derived from the measurements. If the mounting element 3 were stationary, this could be derived in a straightforward manner, because the measurements represent the orientation of the sensor unit 10, and hence the orientation of the rotatable element 5, relative to the gravitational field of the earth as described above. However, as the floating platform 11 on which the mounting element 3 is mounted moves under the influence of waves, the motion of the floating platform 11 and hence the mounting element 3 also affects the measurements.

This creates two types of effect on the measurements.

The first effect is that the orientation of the mounting element 3 itself changes as the floating platform 11 pitches or rolls with the waves in the same plane as the rotation of the rotatable element 5. Typically, such pitching or rolling may be up to +/−15 degrees. The change in orientation of the mounting element 3 changes the orientation of the rotatable element 5 when it is stationary with respect to the mounting element 3. This changes the measurements of acceleration along the axes X and Y, in just the same way as change in orientation of the rotatable element 5 with respect to the mounting element 3. So an individual measurement cannot provide indicate whether the derived orientation arises from the orientation of the rotatable element 5 with respect to the mounting element 3 or the mounting element 3 with respect to the earth's gravitational field.

The second effect is that the actual motion of the floating platform 11 creates accelerations along the axes X and Y in addition to those caused by change of orientation with respect to the earth's magnetic field. Accelerations may be caused by pitch and roll of the floating platform 11. These accelerations are magnified by the height at which the assembly 2 is mounted. Typically, this height is many tens of meters high, so the magnification is quite large. Such accelerations caused by pitch and roll will affect the acceleration along the axes X and Y in different ways depending on the orientation of the rotatable element 5. For example, as pitch and roll causes motion along an arc that is horizontal with respect the assembly 2 as shown in FIGS. 1 and 2, the accelerations are predominantly along the axis X when the rotatable element 5 is in the open position O and along the axis Z when the rotatable element 5 is in the closed position. Accelerations may also be caused by heave, surge and sway of the floating platform 11, but these accelerations are limited by the inertia of the floating platform 11.

Both of these effects change the acceleration that would otherwise be measured for the current orientation of the rotatable element 5 with respect to the mounting element 3.

However, these motions of the mounting element 3 caused by motion of floating platform 11 occur at a much slower rate than the motion of the rotatable element 5 with respect to the mounting element 3. Movements of the rotatable element 5 occur over a period typically no more than 500 ms. In contrast, wave motion which is sufficiently large to affect the measurements typically occurs over a period of at least 5 seconds, more typically at least 10 seconds, although this depends to some extent on the characteristics of the floating platform 11 (e.g. mass and length/beam). This means that the change in the measurements over such a period of time may be taken to be caused by the wave motion and hence to characterize the motion of the mounting element 3. This allows the overall series of measurements taken over the predetermined period of time to be used as the basis to make a correction for the effect of the motion of the mounting element 3 on the measurements.

Typical wave motion increases in period as it increases in magnitude. Accordingly, the predetermined period of time for which measurements are buffered is chosen to be sufficiently long to characterize wave motion of the longest period likely to be encountered in practice. This may depend on where the sensor unit 10 is deployed geographically. Typically, the predetermined period of time is at least 20 seconds, preferably at least 30 seconds.

Figure 23:
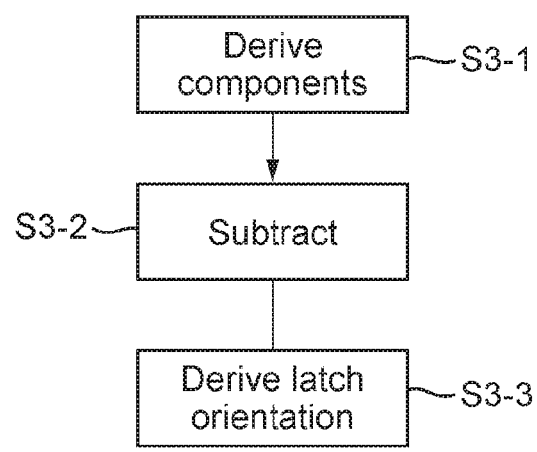
FIG. 23 is a flow chart of a step of deriving a rotational position signal in the sensing method.

Step S3 is performed to derive the rotational position signal, making the correction to compensate for the effect of the motion of the mounting element 3 on the measurements, as shown in FIG. 23 and now described In step S3-1, components of each successive measurement estimated to be caused by the motion of the mounting element 3 are derived from the overall series of measurements buffered in the buffer 54. As described above, the change in the measurements over the predetermined period of time may be taken to derive from the motion of the mounting element 5. Hence, the component of each successive measurement may be estimated from the overall series of measurements previously buffered in the buffer 54.

Step S3-1 may be performed on the overall series of measurements buffered in the buffer 54 by any suitable analysis process, for example a filtering process. For example, if the overall series of measurements may be analyzed to derive the amplitude, frequency and phase of the fundamental frequency component of the series of measurements, which in turn may be used to derive the component of each successive measurement estimated to be caused by the motion of the mounting element 3. More complicated analysis processes may take account of harmonics of the series of measurements.

In step S3-2, the components of each successive measurement derived in step S3-1 is subtracted from the corresponding successive measurements themselves. This results in the derivation of corrected measurements.

In step S3-3, the corrected measurements derived in step S3-2 are used to derive a rotational position signal. As the correction made in steps S3-1 and S3-2 compensates for the effect of the motion of the mounting element 3 on the measurements, the derived rotational position signal represents the rotational position of the rotatable element 5 with respect to the mounting element 3, rather than the rotational position of the rotatable element 5 with respect to the earth's gravitational field.

Where the rotational position signal represents the value of the present rotational position of the rotatable element 5 across its range of movement with respect to the mounting element 3, the value of the present rotational position may be derived from the corrected measurements using a simple geometrical calculation, of the type discussed above.

Alternatively, where the rotational position signal represents that the present rotational position of the rotatable element 5 is an open state, a closed state, or an intermediate state, the open and closed state may be derived by applying a suitable threshold condition on the corrected measurements.

The rotational position signal derived by the processor 42 is supplied to the wireless communication interface 57 which communicates the rotational position signal wirelessly to the monitoring system 65.

Various modifications to the sensor unit 10 may be applied, for example as follows.

In the above example, the correction is applied to the successive measurements themselves. As an alternative, the correction may be applied by first deriving an absolute rotational position signal representing the absolute rotational position of the rotatable element 5 from the successive measurements, and then making a correction to the absolute rotational position signal that compensates for the effect of the motion of mounting element 3 on the measurements on the basis of the overall series of measurements buffered in the buffer 54. For example, the correction may be made by deriving an estimated rotational position signal representing the estimated orientation of the mounting element 3 from the overall series of overall series of measurements buffered in the buffer 54, and then subtracting the estimated rotational position signal from the absolute rotational position signal. The corrected absolute rotational position signal is therefore the rotational position signal representing the orientation of the rotatable element 5 with respect to the mounting element 3.

Techniques may be applied to reduce the power consumption of the sensor circuit 50.

One possible technique for reducing power consumption uses a processor 42 that has an active state in which processing can be performed and an inactive state in which processing cannot be performed, where the processor 42 consumes less power in the inactive state than in the active state. In this case, the buffer 54 is arranged to continually buffer the series of recent measurements, but the processor 42 is initially in the inactive state in which it does not perform step S3. However, the accelerometer processing unit 55 monitors the buffered series of recent measurements and supplies an interrupt signal to the processor 42 when the series of recent measurements exceed a threshold condition. This threshold condition corresponds to a significant degree of motion, that might correspond to change in orientation of the rotatable element 5, albeit that the accelerometer processing unit 55 does not process the measurements and so cannot determine whether the motion corresponds to change in orientation of the rotatable element 5 or change in orientation of the mounting element 3.

The processor 42, which is in the inactive state prior to receipt of the interrupt signal, enters the active state and performs step S3 to derive the rotational position signal upon receipt of the interrupt signal. As a result, the processor 42 which has a relatively high power consumption only perform step S3 to process the measurements when the series of recent measurements exceed the threshold condition which might correspond to movement of the rotatable element 5. Otherwise, when the series of recent measurements do not exceed the threshold condition, no power is consumed by the processor 42. While the processor 42 is in that inactive state, the power consumption by the accelerometer chip 51 is relatively low.

The processor 42 may remain in the active state performing step S3 for a predetermined period of time, or continuously, after the rotatable element 5 has changed state into the open state or the closed state, so as to detect a subsequent change.

Figure 24:
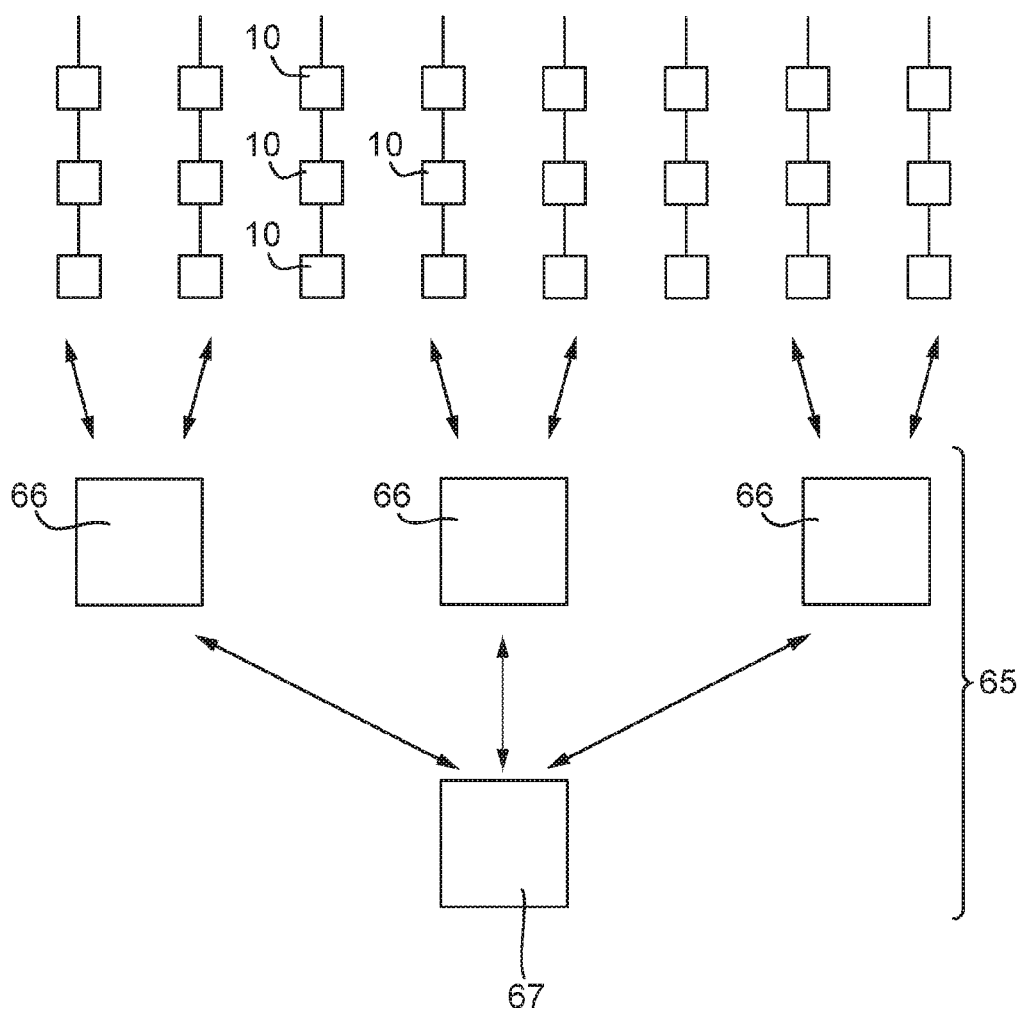
FIG. 24 is a diagram of a monitoring system.

A non-limitative example of the monitoring system 65 is shown in FIG. 24 and will now be described.

The monitoring system 65 comprises plural wireless communication transceivers 66 each arranged to receive rotational position signals wirelessly from a plurality of the sensor units 10. The wireless communication transceivers 66 may be implemented by conventional wireless networking equipment, for example as a router/concentrator. The wireless communication transceivers 66 act as gateways and are distributed to provide overall coverage of the assemblies 2 in the array. For example, the wireless communication transceivers 66 may be located at valve cabinets, to maximize reception and signal coverage. Optionally, the wireless communication transceivers 66 may be located at four locations, east, west, north and south of an array of assemblies 2.

As the wireless signals will be differently polarized depending on the orientation of the rotatable element 5, the wireless communication transceivers 66 may include plural antennae arranged with a spatial diversity for the purpose of maximizing signal strength irrespective of the polarization of the received signals.

The monitoring system 65 also comprises a central unit 67 with which the wireless communication transceivers 66 are further arranged to communicate wirelessly for relaying the rotational position signals and other information from the wireless communication transceivers 66 to the central unit 67. The central unit 67 performs the overall monitoring and processing of the rotational position signals and other information, and may be implemented by any suitable equipment including a wireless communication interface. For example, the central unit 67 may include a conventional computer for processing the received information. The central unit 67 is located at a suitable location to communicate with all the wireless communication transceivers 66. For example the central unit 67 may be located at, or near, the drillers' cabin and/or the Local Equipment Room (LER).

This topology for the monitoring system 65 provides advantages of wide coverage and reliability, particularly if the wireless communication transceivers 66 have overlapping coverage. However, the monitoring system 65 shown in FIG. 24 is not limitative, and in general may have any suitable configuration.

The monitoring system 65 receives rotational position signals and other information from sensor units 10 on each assembly 2 in an array of assemblies, for simultaneously monitoring of all the assemblies 2. The monitoring system 65 described above receives information from the sensor units 10 primarily by wireless communication from the wireless communication interfaces 57. Alternatively or additionally, the monitoring system 65 may monitor the light sources, for example using cameras.

The monitoring system 65 provides an indication of the orientations of the rotatable elements 5 to a user, for example on a display or audibly. The monitoring system 65 may provide a warning when the orientation of any rotatable elements 5 is unexpected and/or in a dangerous state.

The monitoring system 65 may also monitor the other information transmitted from the sensor units 10. Such information representing characteristics of the rotatable element 5 may be may be logged and analyzed to identify rotatable elements 5 that are not performing to specification, or may be in need of maintenance or replacement. This information may be analyzed for condition-based monitoring the rotatable elements 5 to minimize downtime and, by planning maintenance based on likelihood of failure, maximize availability and operational efficiency. In addition, the data logs and metadata may be presented to manufacturers, suppliers, customers or regulators to validate equipment warranty, indicate safety performance and to demonstrate compliance with best practice and compliance with regulations.

The monitoring system 65 may be used to monitor and track information from the geolocation 58 and/or the further sensor 59 in combination with the rotational position.

Some non-limitative examples of monitoring performed by the monitoring system are as follows.

The monitoring system 65 may be used to track condition and integrity of containers, including shipping containers, for example by mounting sensing units 10 on a container 33 as shown in FIG. 14.

The monitoring system 65 may compare rotational position signals from different sensor units 10 and to detect anomalies therein, for example an unexpected relationship between the orientation of particular rotatable elements 5. For example, in FIG. 14 where plural sensor units 10 is mounted on the crane ropes 37 lifting a load (which in this example is the container 33), and may be integrated with further sensors 59 that are load cells and/or strain gauges, comparison of orientation from plural sensor units 10, or comparison of orientation with other parameters such as strain and/or load, could be monitored as being indicative of anomalous conditions such as the crane ropes, slings or straps 37 fraying or vibrating, the load becoming unsecured, the load swaying, or the crane operating outside of design specifications. Similarly, further sensors 59 that are load cells could be included in sensor units 10 to detect anomalous loads or shifting of loads that are provided on pallets, baskets or cradles 72.

By way of example in the case of a sensor unit 10 mounted on a pipe 38 as shown in FIG. 15, the monitoring system 65 may monitor the level 44 or composition of a fluid 39, as sensed by a further sensor 59, with respect to pipe orientation.

By way of example in the case of a sensor unit 10 mounted on a container 40 as shown in FIG. 16, the monitoring system 65 may monitor the level of a surface 45 and/or an interface 46, as sensed by a further sensor 59, with respect to orientation which could be important in storage and production of oil and water for example, or may monitor the output of a further sensor 59 such as a load cell and use that to compute mass or volume corrected with respect to rotational position.

The invention claimed is:

1. A sensor unit that is mountable on a rotatable element on a platform that is itself movable, the sensor unit, comprising:
   an orientation sensor arranged to take measurements that are dependent on the orientation of the sensor unit; and
   a processor arranged to derive a rotational position signal representing the orientation of the rotatable element from the measurements; and
   a buffer arranged to buffer a series of recent measurements taken by the orientation sensor over a predetermined period of time,
   wherein the processor is arranged to derive the rotational position signal making a correction to compensate for the effect of the motion of the platform on the measurements on the basis of the overall series of measurements buffered in the buffer.

2. A sensor unit according to claim 1, wherein the processor is arranged to derive a rotational position signal by:
   correcting successive measurements to compensate for the effect of the motion of the platform on the measurements on the basis of the overall series of measurements buffered in the buffer; and
   deriving the rotational position signal from the corrected successive measurements.

3. A sensor unit according to claim 2, wherein the processor is arranged to perform the step of correcting the measurements by:
   deriving, from the overall series of measurements buffered in the buffer, components of successive measurements estimated to be caused by the motion of the platform; and
   subtracting the derived components of the successive measurements estimated to be caused by the motion of the platform from the successive measurements to derive the corrected measurements.

4. A sensor unit according to claim 1, wherein
   the processor has an active state in which processing can be performed and an inactive state in which processing cannot be performed, the processor consuming less power in the inactive state than in the active state,
   the buffer is arranged to continually buffer the series of recent measurements;
   the sensor unit further comprises a sensor processing unit arranged to monitor the buffered series of recent measurements and to supply an interrupt signal to the processor when the series of recent measurements exceed a threshold condition, and
   the processor is arranged to be in the inactive state prior to receipt of the interrupt signal and to enter the active state and to derive the rotational position signal upon receipt of the interrupt signal.

5. A sensor unit according to claim 1, wherein the predetermined period of time is at least 20 seconds, preferably at least 30 seconds.

6. A sensor unit according to claim 1, wherein the rotational position signal represents the value of the present orientation of the rotatable element.

7. A sensor unit according to claim 1, wherein the rotational position signal represents that the present orientation of the rotatable element is an open position, a closed position or an intermediate position.

8. A sensor unit according to claim 1, wherein the orientation sensor is an accelerometer and the measurements represent acceleration relative to an inertial frame.

9. A sensor unit according to claim 8, wherein the sensor unit further includes a low pass-filter arranged to filter the measurements supplied from the orientation sensor to the processor.

10. A sensor unit according to claim 9, wherein the low-pass filter has a cut-off frequency of at most 50 Hz, preferably at most 25 Hz.

11. A sensor unit according to claim 8, wherein the accelerometer is a microelectromechanical systems device.

12. A sensor unit according to claim 8, further including an analog-to-digital converter arranged to analog-to-digital convert the filtered measurements supplied from the low-pass filter to the processor.

13. A sensor unit according to claim 8, wherein the processor is further arranged to associate metadata with the rotational position signal.

14. A sensor unit according to claim 13, wherein the metadata includes one or more of: time information, sensor identity, rotatable element identity, number of rotatable element cycles, count of rotatable element being in open position, count of rotatable element being in closed position, rotatable element speed, rotatable element acceleration, battery level, orientation sensor signal level.

15. A sensor unit according to claim 1, wherein the sensor unit further includes a geolocation unit arranged to detect the location of the sensor unit, and the metadata includes the location detected by the geolocation unit.

16. A sensor unit according to claim 1, further including a light source, the sensor unit being arranged to modulate the light output by the light source to represent the orientation of the rotatable element.

17. A sensor unit according to claim 1, wherein the platform is a floating platform.

18. A sensor unit according to claim 1, wherein the sensor unit is mounted on the rotatable element.

19. A sensor unit according to claim 18, wherein the rotatable element is mounted on a mounting element that is mounted on the platform, and the rotatable element is rotatable within a limited range of rotation.

20. A sensor unit according to claim 19, wherein the limited range of rotation is less than a complete turn.

21. A sensor unit according to claim 1, further including a wireless communication interface arranged to wirelessly communicate the rotational position signal.

22. A sensor system, comprising:
a plurality of sensor units, each according to claim 21; and
a monitoring system comprising at least one wireless communication transceiver arranged to receive the rotational position signals wirelessly from the sensor units.

23. A sensor system according to claim 22, wherein the monitoring system includes plural wireless communication transceivers and a central unit, the wireless communication transceivers being further arranged to communicate wirelessly with the central unit for relaying the rotational position signals to the central unit.

24. A sensor system according to claim 22, wherein the monitoring system is arranged to compare rotational position signals from different sensor units and to detect anomalies therein.

25. An assembly, comprising:
a mounting element;
a rotatable element rotatably mounted on the mounting element,
a sensor unit according to claim 1 mounted on the rotatable element.

26. A method of sensing the orientation of a rotatable element on a platform that is itself movable, the method, comprising:
taking measurements using a sensor unit mounted on the rotatable element that are dependent on the orientation of the sensor unit;
buffering a series of recent measurements taken over a predetermined period of time in a buffer, and
deriving, from the measurements, a rotational position signal representing the orientation of the rotatable element, making a correction to compensate for the effect of the motion of the platform on the measurements on the basis of the overall series of measurements buffered in the buffer.

27. A method according to claim 26, wherein the step of deriving a rotational position signal comprises:
correcting successive measurements to compensate for the effect of the motion of the platform on the measurements on the basis of the overall series of measurements buffered in the buffer; and
deriving the rotational position signal from the corrected successive measurements.

28. A method according to claim 27, wherein the step of correcting successive measurements comprises:
deriving, from the overall series of measurements buffered in the buffer, components of successive measurements estimated to be caused by the motion of the platform; and
subtracting the derived components of the successive measurements estimated to be caused by the motion of the platform from the successive measurements to derive the corrected measurements.

29. A method according to claim 26, wherein the predetermined period of time is at least 20 seconds, preferably at least 30 seconds.

30. A method according to claim 26, wherein
the step of deriving a rotational position signal is performed in a processor which has an active state in which processing can be performed and an inactive state in which processing cannot be performed, the processor consuming less power in the inactive state than in the active state,
the step of buffering a series of recent measurements taken over a predetermined period of time in a buffer is performed continually;
the method further comprises a step of a sensor processing unit monitoring the buffered series of recent measurements and to supply an interrupt signal to the processor when the series of recent measurements exceed a threshold condition, and
the processor being in the inactive state prior to receipt of the interrupt signal and enter the active state and performing the step of deriving a rotational position signal upon receipt of the interrupt signal.

31. A method according to claim 26, wherein the rotational position signal represents the value of the present orientation of the rotatable element across the range of movement.

32. A method according to claim 26, wherein the rotational position signal represents that the orientation of the rotatable element is an open position, a closed position or an intermediate position.

33. A method according to claim 26, wherein the step of taking measurements is performed by an accelerometer and the measurements represent acceleration relative to an inertial frame.

34. A method according to claim 33, further comprising low pass-filtering the measurements before deriving the rotational position signal therefrom.

35. A method according to claim 34, wherein the low-pass filtering has a cut-off frequency of at most 50 Hz, preferably at most 25 Hz.

36. A method according to claim 34, wherein the accelerometer is a microelectromechanical systems device.

37. A method according to claim 34, further including analog-to-digital converting the filtered measurements before deriving the rotational position signal therefrom.

* * * * *